United States Patent Office 3,192,831
Patented July 6, 1965

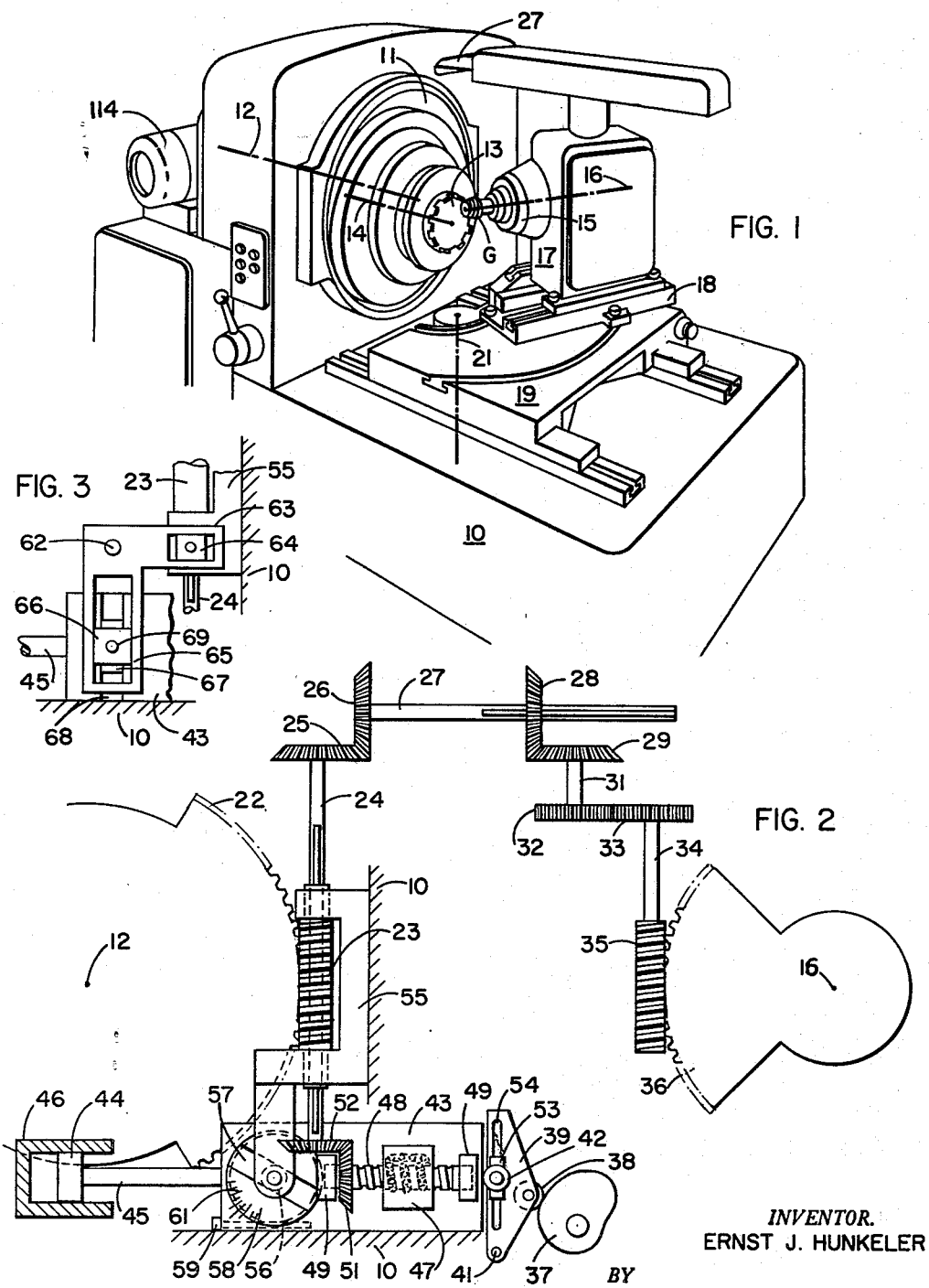

3,192,831
GEAR GENERATOR
Ernst J. Hunkeler, Fairport, N.Y., assignor to The Gleason Works, Rochester, N.Y., a corporation of New York
Filed June 13, 1963, Ser. No. 287,535
16 Claims. (Cl. 90—5)

The present invention relates to machines for generating gears and has particular relation to the generating gear train which drivingly connects the work spindle and the movable support for the spindle or for the tooth cutting tool means of the machine.

In conventional machines, particularly bevel and hypoid gear generators, the tool or tools are carried by a cradle which is rotated back and forth in time with back and forth rotation of the work spindle, the cradle and spindle being connected by the generating gear train which is actuated by a suitable power-operated reversing drive. For cutting gears of different tooth number combinations the angular velocity of the spindle relative to that of the cradle is varied by the exchange of ratio change gears included in the train. Since the velocity ratio for accurate gears must be exact and the number of different tooth number combinations is very great, a large number of change gears is required. In order to avoid the expense and handling problems incident to such a large number of change gears, it has been proposed heretofore to replace these gears by adjustable-length levers or similar adjustable-ratio proportioning devices. However in order to provide the wide range of ratio change and and the amplitude of motion that is needed, such proportioning devices have been found to be difficult to incorporate in machines other than those for cutting only small gears and those for cutting gears falling within a relatively narrow gear-ratio range.

The object of the present invention is to avoid, on one hand, a large number of ratio change gears, and, on the other hand, to obtain the advantage of simplicity and compactness that is possible when ratio change gears rather than adjustable-ratio proportioning devices are used. This is accomplished by employing change gears for making coarse changes in ratio and an adjustable ratio proportioning device for making fine changes of ratio. With this arrangement only a small number of change gears is required for a wide range of work, while at the same time extremely fine adjustment of ratio may be made without any substantial sacrifice of simplicity or compactness.

A gear generator according to the invention comprises a tool support upon which tool means are mounted for cutting motion, a rotatable work spindle and a support therefor, said supports being arranged for relative movement in time with rotation of the spindle to effect rolling generating motion between a work gear on the spindle and said tool means, a generating gear train drivingly connecting for such generating motion the spindle and the movable one of said supports, said train including change gears whereby coarse changes may be made in drive ratio between the work spindle and the movable support, and, for effecting fine changes in said ratio, an adjustable-ratio proportioning device having rectilinearly reciprocable input and output slides both of which are connected to said train.

Preferably the connection of one of the slides to the drive train is through differential gearing comprising a worm and worm gear, the worm being movable axially by the slide. By this arrangement these gears serve both as differential and as reduction gearing.

Conveniently one slide of the proportioning device is used in the power drive of the generating train. To this end the slide is reciprocated by a motor driven cam, and the reciprocating motion is converted to reversing rotation by a screw element having a recirculating ball nut element thereon. One of these elements is reciprocable axially with the slide and is constrained against rotation, while the other is constrained against axial motion and constitutes a rotating drive element of the generating train.

In the accompanying drawings,
FIG. 1 is a perspective view of the machine;
FIG. 2 is a drive diagram of the machine; and,
FIG. 3 is a diagram illustrating an alternative type of adjustable-ratio proportioning device.

The machine comprises a frame 10 supporting a drum-shaped cradle 11 for rotation about horizontal axis 12. The cradle supports a motor-driven cutting tool 13 which in the illustrated embodiment, intended for cutting spiral bevel gears, is a face mill cutter rotatable on the cradle about axis 14. The cutting tool is supported in a known manner for adjustment on the cradle, to enable the cutting of gears of different designs. The work gear G is supported in a suitable work holder on a spindle 15 that is rotatable about horizontal axis 16 in a work head 17. The latter is supported, for adjustment in the direction of axis 16, on a swinging base 18 which itself is adjustable angularly upon a sliding base 19 about a vertical axis 21 which intersects both axis 12 and axis 16. The sliding base 19 is adjustable on the frame 10 in the direction of axis 12, and also is adapted for feed and withdrawal motions in that direction. The cutter 13 and a feed cam, for effecting work infeed and withdrawal motion of the sliding base 19, are driven by motor 114 in a known manner.

The generating gear train which drivingly connects the cradle 11 and work spindle 15 comprises a worm gear sector 22 secured to the cradle and meshing with a worm 23 whose vertically-disposed shaft 24 is rotatable but axially immovable in the frame; mating bevel gears 25, 26; overhead horizontal shaft 27 to which a bevel gear 28 is splined for axial movement; bevel gear 29 on a vertical shaft 31 journaled for rotation in work head 17, ratio-of-roll change gears 32 and 33 detachably keyed respectively to shaft 31 and to a vertical shaft 34 that is rotatable but axially immovable in the work head; a worm 35 affixed to shaft 34 and a mating worm gear sector 36 rotatable about axis 15. A suitable indexing mechanism is provided in the work head for effecting stepwise rotational advance of the work spindle relative to sector 36, to bring successive tooth spaces of the work gear into position for cutting on successive operating cycles of the generating train. Such mechanism, which interconnects the worm gear sector 36 with the work spindle 15, may be of any known type, and not being a part of the present invention, is not illustrated herein. Or, if desired, the indexing mechanism may be connected to the generating train at another point in the latter. For example, the indexing motion may be introduced into the train in a known manner through a differential gear mechanism interposed between shaft 24 and gear 25. With such an arrangement the worm gear sector 36 would, of course, have to be replaced by a complete worm gear.

The generating train is operated by a rotary cam 37 that is driven by motor 114 through suitable reduction gearing, not shown. The cam acts against a follower roller 38 on a lever 39 that is pivoted to the machine frame 10 at 41. A roller 42 on the lever engages a slide 43 guided for horizontal motion on the frame, the slide being held against the roller by a piston 44 connected thereto by rod 45, the piston being urged constantly to the right, in FIG. 2, by fluid pressure in cylinder 46 on the frame. The slide 43 has rigidly secured thereto a recirculating ball nut 47 threaded upon a screw 48 that is journaled for rotation in the frame by suitable antifriction bearings 49 which constrain it against axial motion. Accordingly the axial reciprocation of the nut effected by the cam 37 causes reversing rotation of the screw 48. A bevel gear 51 on the latter imparts this rotation to a mating bevel gear 52 affixed to shaft 24, to thereby drive the generating train. The angle through which the elements of the train rotate back and forth during each operating cycle, i.e. through each turn of the cam 37, may be varied by increasing or decreasing the effective length of the lever arm 41–42, and for this purpose the roller 42 is supported by a block 53 which is adjustable along a slot 54 in lever 39.

The ratio-of-roll of the machine, i.e. the angular velocity ratio between gear sector 22 and gear sector 36, may be varied by exchanging gears 32, 33 for others of different ratio. In accordance with the present invention only a few such gears 32, 33 need be provided, for making coarse changes in the ratio-of-roll. Fine changes in the ratio are made by adjusting the magnitude of an axial motion of the worm 23 which adds to (or subtracts from) the angular motion imparted to the worm gear 22. The worm 23 is splined to shaft 24 for such axial motion and is supported by a slide 55 which is guided for vertical motion on the frame 10 in a path parallel to shaft 24. A roller 56 on the slide 55 is engaged in a straight guide slot 57 in a disc 58 carried by slide 43. By means of a screw 59 which is rotatable in the slide and engages worm gear teeth on the periphery of the disc, the latter may be adjusted to vary the inclination of the guide 57 relative to the horizontal path of slide 43. When the guide is parallel to this path, no motion is imparted to roller 56 as the slide 43 reciprocates, but when the guide is adjusted to an angle to this path, a vertical motion proportional to the motion of slide 43 is imparted to the roller and to worm 23. Preferably the slide 43 and the disc 58 are provided with graduations 61 to facilitate fine adjustment of the guide 57 to the exact inclination desired.

It will thus be seen that the slides 43, 55 and the adjustable guide and roller 56, 57 constitute an adjustable-ratio proportioning device, which, through the differential gearing consisting of the worm gear 22 and the rotary and axially movable worm 23, may add to (or subtract from) the angular motion imparted to the cradle by the rotation of the generating train. The axial motion of the worm effected by the device 43, 55–57 may be relatively small, since it is required only to adjust the ratio-of-roll by one of the increments of the coarse adjustment provided by exchange of the gears 32, 33. In the event the change gears 32, 33 themselves provide the exact ratio-of-roll that is desired, adjustment of guide slot 57 into parallelism with the path of slide 43 automatically secures the slide 55 against vertical motion.

The mechanism shown in the drawings may be modified in various ways within the purview of the invention. As one example, the particular proportioning device shown in FIG. 2 for fine adjustment of ratio-of-roll may be replaced by one of another type, such as that shown in FIG. 3. There a bellcrank lever is fulcrummed at 62 to the machine frame 10. Arm 63 of the lever slidingly engages a block 64 pivoted to vertical slide 55 which carries the worm 23 for axial motion. The other arm of the lever, designated 65, slidingly engages a block 66 which is pivoted to a block 67 that is adjustable relative to slide 43 along a vertical guide groove 68 in the latter, by an adjusting screw, not shown. Horizontal reciprocation of slide 43 effected by cam 37 results in swinging of the lever, causing vertical reciprocation of slide 55, and, as will be apparent, the relative magnitudes and the velocity ratio of these horizontal and vertical reciprocations may be changed by adjusting the position of block 67 along guide grooves 68. However, with the particular lever configuration illustrated, where the pivot 69 of blocks 66, 67 cannot be adjusted to coincide with or to be above the fulcrum 62, adjustment cannot be made to a condition in which no axial motion is imparted to the worm 23 or to a condition in which the direction of axial motion of the worm is reversed with respect to that of slide 43. Both of these conditions may be obtained with the mechanism illustrated in FIG. 2.

I claim as my invention:

1. A gear generator comprising a tool support upon which tool means are mounted for cutting motion, a rotatable work spindle and a support therefor, said supports being arranged for relative movement in time with rotation of the spindle to effect rolling generating motion between a work gear on the spindle and said tool means, a generating gear train drivingly connecting for such generating motion the spindle and the movable one of said supports, said train including change gears whereby coarse changes may be made in drive ratio between the work spindle and the movable support, and, for effecting fine changes in said ratio, an adjustable-ratio proportioning device having rectilinearly reciprocable input and output slides both of which are connected to said train.

2. A generator according to claim 1 in which the connection of one of said slides is through differential gearing.

3. A generator according to claim 2 in which said differential gearing comprises a worm and worm gear in said train, with the worm supported for axial motion, and said one of said slides is connected to the worm for effecting such axial motion.

4. A generator according to claim 2 in which there is a rotary cam for reciprocating one of said slides, the latter being drivingly connected to said train to impart reversing rotary motion thereto upon reciprocation by the cam.

5. A generator according to claim 4 in which the connection of the last-mentioned slide to the train comprises a recirculating ball nut on the slide threaded to a screw which constitutes a rotary element of said train.

6. A gear generator according to claim 5 in which the other one of said slides is connected to the worm, of a worm and worm gear pair in said generating train, for reciprocating said worm axially, said worm gear and axially reciprocating worm constituting said differential gearing.

7. A gear generator according to claim 6 in which said support for the tool means is the movable one of said supports, the movement thereof comprising reversing rotation imparted by said worm gear, the latter being secured to said support.

8. A gear generator according to claim 7 in which said worm gear is secured to said support for the tool means.

9. A generator according to claim 1 in which said slides of said proportioning device are reciprocable at an angle to each other, one slide has a roller engaging in a straight guide in the other slide, and said guide is angularly adjustable on said other slide to vary the input-output proportion of the device.

10. A generator according to claim 1 in which said slides of said proportioning device are connected by a lever, said lever having adjustment means associated therewith for varying the relative effective length of the lever arms.

11. A gear generator comprising a tool support upon which tool means are mounted for cutting motion, a rotatable work spindle and a support therefor, said supports being arranged for relative movement in time with rotation of the spindle to effect rolling generating motion between a work gear on the spindle and said tool means, a generating gear train drivingly connecting for such motion the spindle and the movable one of said supports, said train including a worm meshing with a worm gear on one of said spindle and said cradle, said train including change gears whereby coarse changes may be made in drive ratio between the work spindle and the movable support, and, for effecting fine changes in said ratio, a steplessly adjustable ratio varying transmission whose input and output elements operate in constant velocity ratio, said input element being drivingly connected to said drive train and said output element being connected to said worm for moving the latter axially, and a reversing drive for said drive train and said input element of said transmission.

12. A gear generator according to claim 11 in which said tool support comprises a rotatable cradle, said worm gear is on the cradle, and said train includes another worm meshing with a worm gear on the work spindle.

13. A gear generator comprising a tool support upon which tool means are mounted for cutting motion, a rotatable work spindle and a support therefor, said supports being arranged for relative movement in time with rotation of the spindle to effect rolling generating motion between a work gear on the spindle and said tool means, a generating gear train drivingly connecting for such generating motion the spindle and the movable one of said supports, a screw element having a recirculating ball nut element threaded thereon, one of said elements being reciprocable axially and constrained against rotation and the other one of said elements being constrained against axial motion and being a rotatable element of said train, and a cam arranged to reciprocate said one of said elements to thereby effect reversing rotation of said generating gear train.

14. A generator according to claim 11 in which there is an adjustable-length cam-follower lever interposed between said cam and said one of said elements, to provide for adjustment of the angle through which the elements of the generating train rotate back and forth during each revolution of the cam.

15. A gear generator comprising a tool support upon which tool means are mounted for cutting motion, a rotatable work spindle and a support therefor, one of said supports being arranged for movement in time with rotation of the spindle to effect rolling generating motion between said tool means and a work gear on the spindle, a generating drive train including a reciprocating slide drivingly connected to said one of said supports and a rotary shaft drivingly connected to the spindle, a screw element having a recirculating ball nut element threaded thereon, one of said elements being carried by said slide for reciprocation therewith and being constrained against rotation, and the other of said elements being constrained against axial motion and being connected to said shaft for rotation therewith.

16. A gear generator according to claim 15 in which there are means for actuating said generating train comprising a cam for imparting reciprocating motion to said slide.

References Cited by the Examiner
UNITED STATES PATENTS 2,302,004 11/42 Carlsen _____ 90—5
2,342,232 2/44 Wildhaber _____ 90—5

WILLIAM W. DYER, Jr., *Primary Examiner.*